(12) United States Patent  
Kausik

(10) Patent No.: US 7,330,836 B2
(45) Date of Patent: Feb. 12, 2008

(54) METHOD AND SYSTEM FOR SECURE AUTHENTICATED PAYMENT ON A COMPUTER NETWORK

(75) Inventor: Balas N. Kausik, Los Gatos, CA (US)

(73) Assignee: Arcot Systems, Inc., Palo Alto, CA (US)

( * ) Notice: Subject to any disclaimer, the term of this patent is extended or adjusted under 35 U.S.C. 154(b) by 0 days.

(21) Appl. No.: 11/105,195

(22) Filed: Apr. 12, 2005

(65) Prior Publication Data

US 2005/0246290 A1 Nov. 3, 2005

Related U.S. Application Data

(63) Continuation of application No. 09/437,065, filed on Nov. 9, 1999, now Pat. No. 6,895,391.

(51) Int. Cl.
*G06Q 99/00* (2006.01)
(52) U.S. Cl. .......................................... 705/50; 705/51
(58) Field of Classification Search ................. 705/50, 705/51
See application file for complete search history.

(56) References Cited

U.S. PATENT DOCUMENTS

| 5,511,122 A | 4/1996 | Atkinson |
| 5,590,197 A | 12/1996 | Chen et al. |
| 5,815,657 A | 9/1998 | Williams et al. |
| 5,850,442 A | 12/1998 | Muftic |
| 5,883,810 A | 3/1999 | Franklin et al. |
| 6,000,832 A | 12/1999 | Franklin et al. |
| 6,061,791 A | 5/2000 | Moreau |
| 6,098,053 A | 8/2000 | Slater |
| 6,233,565 B1 * | 5/2001 | Lewis et al. ................. 705/35 |
| 6,895,391 B1 * | 5/2005 | Kausik ......................... 705/50 |

FOREIGN PATENT DOCUMENTS

| GB | 2333878 A | 8/1999 |
| JP | 410135943 A | 5/1998 |
| JP | 2004295610 A * | 10/2004 |
| WO | WO 99/49424 A1 | 9/1999 |
| WO | WO 00/75749 A2 | 12/2000 |
| WO | WO 00/75843 A1 | 12/2000 |

* cited by examiner

*Primary Examiner*—Pierre Eddy Elisca
(74) *Attorney, Agent, or Firm*—Townsend and Townsend and Crew LLP

(57) ABSTRACT

A simple, secure and easy-to-deploy method and system for authenticating credit and debit cardholders at the point-of-sale on a computer network (e.g. the Internet) is disclosed. Cardholders are authenticated using digital signatures on a sales draft, in a manner that does not necessarily require any changes in the transaction flow of the participating financial institutions.

19 Claims, 5 Drawing Sheets

Electronic payment card (optionally access code protected):

Cardholder's digital certificate, portions of which are encrypted with a domain key, comprising:
- Cardholder's public key
- Some or all of cardholder's payment particulars (e.g., PIN, conventional payment card number, etc.)

Cardholder's private key (optionally access code protected)

Some or all of cardholder's payment particulars (e.g., PIN, conventional payment card number, etc.)

FIG. 2A

METHOD AND SYSTEM FOR SECURE AUTHENTICATED PAYMENT ON A COMPUTER NETWORK

CROSS-REFERENCE TO RELATED APPLICATIONS

This application is a continuation of U.S. Ser. No. 09/437,065, filed Nov. 9, 1999, now U.S. Pat. No. 6,895,391, which is incorporated herein by reference in its entirety for all purposes.

FIELD OF THE INVENTION

The present invention relates to a method and system for secure authenticated payment at a point-of-sale on a computer network. More particularly, the present invention allows the use of digital signatures on a sales draft to authenticate purchasers in a manner that does not necessarily require any changes in the transaction processing of the financial institutions participating in the transaction.

BACKGROUND OF THE INVENTION

In present electronic commerce transactions, buyers may pay for goods and services by presenting the seller with a payment card number, e.g., a conventional credit card number. Because the buyer and seller are connected solely through a computer network (e.g., the Internet), it is not possible for the buyer to authenticate himself as the legitimate cardholder, nor can the buyer sign the sales draft. Thus, the seller honors any valid credit card number that is presented, creating a large opportunity for fraud.

Worse yet, other forms of payment such as debit cards are not presently viable on computer networks. Debit cards require the cardholder to enter a personal identification number ("PIN"), which is used to authenticate the transaction to the cardholder's bank. However, entering a simple PIN on a networked computer poses a substantial security risk—if the PIN and the debit-card number fell into the wrong hands, the cardholder's bank account would be completely compromised.

Thus, with respect to both conventional credit and debit cards, authenticating a cardholder on the network with a solution that is simple, secure, and easy to deploy remains an important unsolved problem.

Digital signature technology offers one means of authenticating the cardholder with a high degree of security. In this technology, each cardholder owns a pair of keys—a signature (private) key and a verification (public) key. The cardholder signs a transaction with his private key, and then sends the transaction, the digital signature, and (optionally) his public key to the merchant. The merchant forwards these items to the bank (or other financial institution), and the bank honors the transaction if the cardholder's public key verifies the cardholder's digital signature.

One security advantage of digital signatures is that the private key of the cardholder typically remains in possession (or at least control) of the cardholder. Thus, there is no inherent risk associated with a transaction that would compromise future transactions. One disadvantage of the digital signature method described above is that banks and transaction processors would have to change their existing infrastructure to allow digital signatures to flow through their networks. This infrastructure change would basically require a substantial overhaul of the present electronic banking and transaction processing system, which is costly and difficult to achieve.

Thus, there is a need for a method and system that offers the security advantages of digital signatures without necessarily requiring significant changes in the banking and processing network.

SUMMARY OF THE INVENTION

One embodiment of the present invention includes a simple, secure and easy-to-deploy method and system for authenticating credit and/or debit cardholders at a point-of-sale on a computer network (e.g., the Internet). Cardholders are authenticated using digital signatures on a sales draft, in a manner that does not necessarily require any changes in the transaction process of the financial institutions participating in the transaction.

In this embodiment of the system, the cardholder enrolls for an electronic payment card (either an electronic debit or credit card) at a participating financial institution by visiting its issuer proxy enrollment site, e.g., a web site hosted by an issuer proxy computer associated with the financial institution. At the enrollment site, the cardholder types in his particulars, such as his conventional payment card number, conventional payment card PIN, name, address, etc. The cardholder also (optionally) selects a password (access code) for his electronic payment card that is preferably unrelated to the PIN for his conventional payment card. The issuer proxy generates a public key-private key pair for use by the cardholder if the cardholder does not already have such a pair. The issuer proxy binds the cardholder's public key and some or all of the cardholder's payment particulars in a digital certificate using an encryption key (called a domain key) that is shared between the issuer proxy and a bridge computer. Such a domain key will allow the bridge computer to confirm the issuer's certification during a subsequent authorization stage, described below. The cardholder then receives a piece of software that is downloaded to his computer containing his particulars in encrypted form. This piece of software constitutes the cardholder's electronic payment card. It comprises (or is configured to obtain and use) the cardholder's private key, which is (optionally) protected by the password, and the corresponding public-key digital certificate containing the cardholder's payment particulars.

Thenceforth, as the cardholder shops online, he can elect to pay via electronic payment. To do so, the cardholder activates his electronic payment card with the previously selected password. The cardholder's electronic payment card software interacts with corresponding software at the online merchant to digitally sign the sales draft created during the transaction with the cardholder's private key. The merchant then sends the signed sales draft and the cardholder's digital certificate to the bridge computer for processing. The bridge computer uses the cardholder's digital certificate to check the digital signature on the sales draft. If the signature is valid, the bridge computer creates a conventional debit or credit transaction to be processed by the banking and transaction network. The particulars needed for creating the conventional transaction, such as the conventional card number and PIN, are extracted and decrypted from the cardholder's digital certificate using the private key associated with the domain key (if the digital certificate was asymmetrically encrypted) or the domain key itself (if the digital certificate was symmetrically encrypted). The embodiment of the invention described above provides one or more or the following advantages:

(1) Additional hardware at the cardholder's computer is not necessarily required for deployment. This is in marked contrast to hardware tokens such as smart cards, where cards and card readers are required. Of course, the software comprising the cardholder's electronic payment card can be stored on smart cards, as well as virtually any other storage medium, including, without limitation, floppy disks, hard drives, and magnetic stripe cards;

(2) Changes are not necessarily required in the existing banking network;

(3) Administrative overhead is low. The cardholder can enroll at any participating financial institution that offers the service, not necessarily the one that issued the cardholder's conventional payment card. Furthermore, enrollment can be on a self-serve basis and does not necessarily require activation mailings by the financial institutions;

(4) Electronic payment cards can be deployed rapidly, because they are intuitive to use and require little user or administrator training; and/or (5) Security can be enhanced via special techniques such as "cryptographic camouflaging," which is commercially available from Arcot Systems, Inc.

The foregoing and other embodiments and aspects of the present invention will become apparent to those skilled in the art in view of the subsequent detailed description of the invention taken together with the accompanying figures and appended claims.

BRIEF DESCRIPTION OF THE DRAWINGS

FIG. 2A illustrates an exemplary electronic payment card created using the preferred embodiment of the invention.

DETAILED DESCRIPTION OF THE INVENTION

Figure 1:
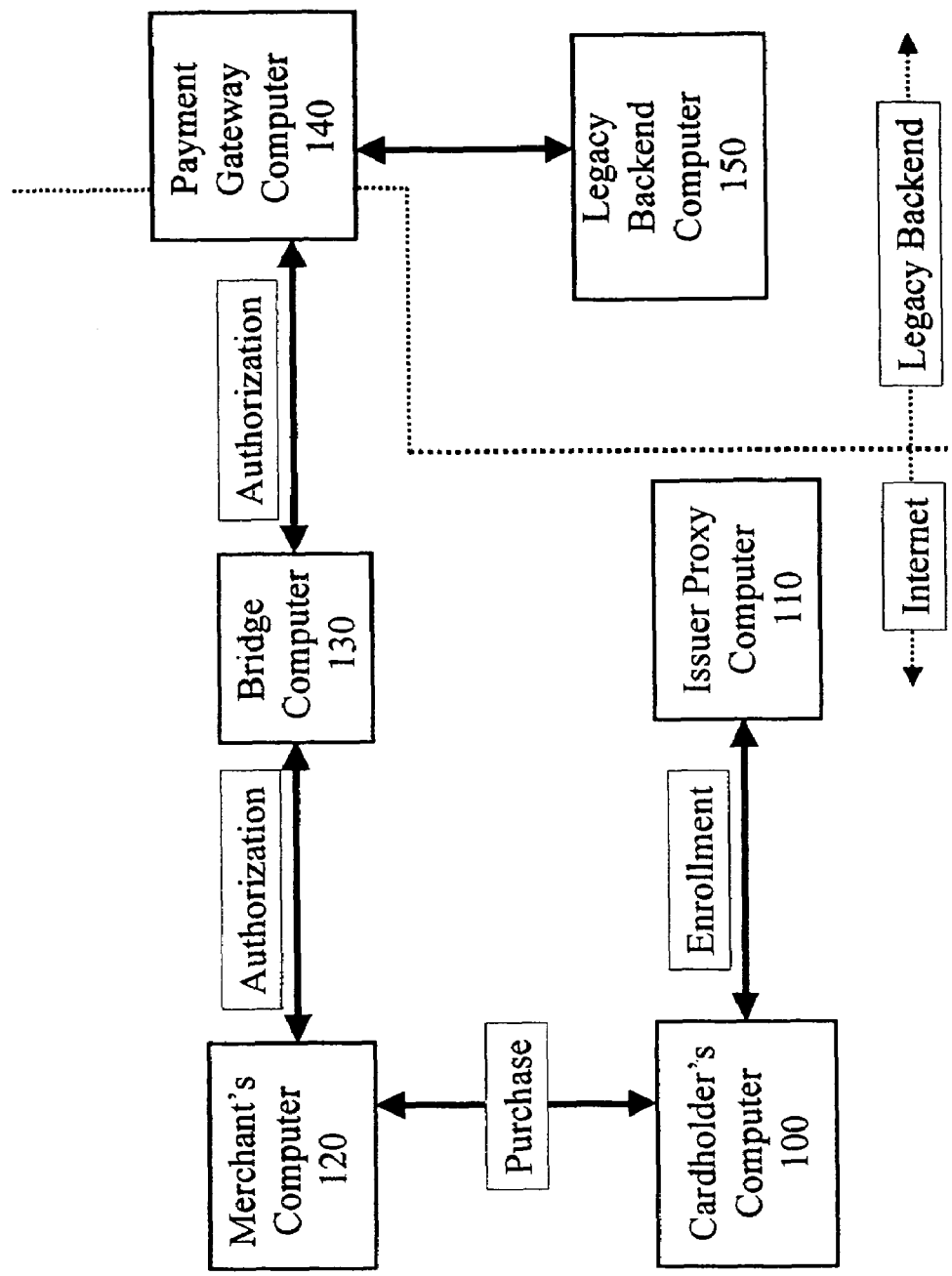
FIG. 1 is a block diagram illustrating an exemplary computer system for secure authenticated payment on a computer network.

FIG. 1 is a block diagram illustrating an exemplary computer system for secure authenticated payment on a computer network (e.g., the Internet). The system contemplates a network of computers including a cardholder's computer 100, a payment card issuer's proxy computer 110, a merchant's computer 120, a bridge computer 130, a payment gateway computer 140, and legacy backend computer 150. In this exemplary embodiment, the network is deployed over the Internet, although those skilled in the art will recognize that any public or private communication network including, without limitation, extranets, intranets, and other telephonic or radio communications networks could also be used. Similarly, as used herein, the term computer refers to any device that processes information using an integrated circuit chip, including without limitation mainframe computers, work stations, servers, desktop computers, portable computers, embedded computers, and handheld computers.

Enrollment

Figure 2:
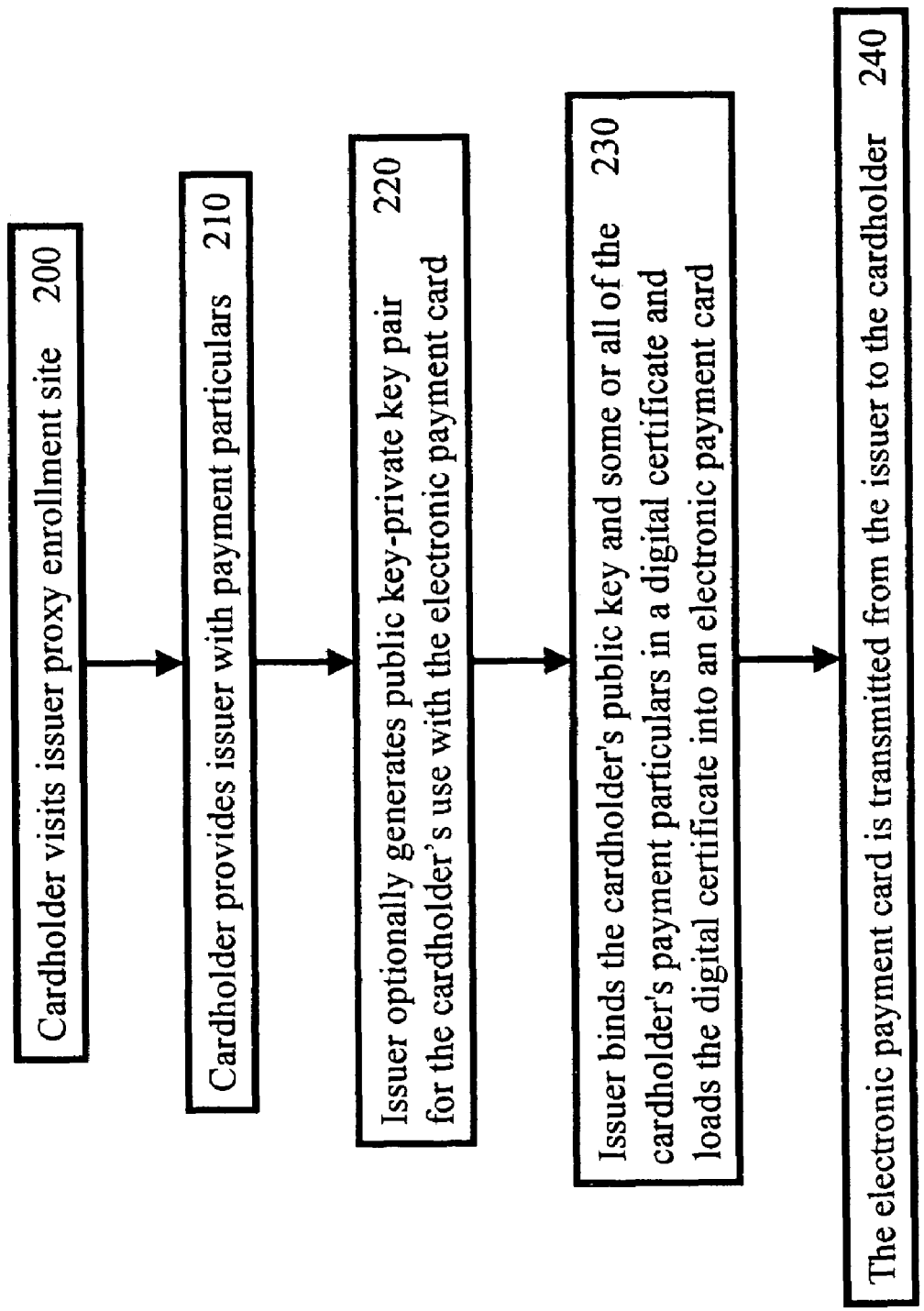
FIG. 2 is a flow chart illustrating an exemplary method for cardholder enrollment for an electronic payment card.

Referring now to FIG. 2, at step 200, a cardholder (user) at computer 100 enrolls for an electronic payment card (either an electronic debit card or an electronic credit card) at the electronic payment card issuer proxy 110, typically by visiting the website of a participating financial institution on the Internet. At step 210, the cardholder provides the issuer 110 with particular information used to make a payment (payment particulars), such as his conventional payment card number, conventional payment card PIN, conventional credit card holder verification value 2 ("CVV2"), conventional cardholder name and address, or any other cardholder identification information. The issuer proxy 110 can be operated by any trusted financial institution that participates in the electronic payment system, not necessarily the financial institution that issued the cardholder's conventional payment card.

The issuer proxy 110 can optionally verify the cardholder's payment information by any of the means available for such verification including, without limitation, creating a payment transaction in the conventional payment network. Such a transaction could be "authorization only" in the sense that it would be used only for verifying the cardholder's payment particulars, with no money actually transferred.

At step 220, the issuer 110 generates a public key-private key pair for the cardholder to use in connection with the electronic payment system. If the cardholder already has a public key-private key pair that he wishes to use in connection with the electronic payment system, he provides his public key to the issuer 110. The cardholder's private key is typically stored on the cardholder's computer 100, often under the control of a PIN or other form of access code (password). The access code can be protected against unauthorized detection using commercially available software technology such as software smart cards from Arcot Systems, Inc., described in "Software Smart Cards via Cryptographic Camouflage," Proceedings IEEE Symposium on Security and Privacy, May 1999, and in co-pending U.S. patent application Ser. No. 08/996,758, "Method and Apparatus for Secure Cryptographic Key Storage Certification and Use," which is incorporated herein by reference.

The access code may also be protected against unauthorized detection (e.g., so-called "shoulder surfing") using the technology described in co-pending U.S. patent application Ser. No. 09/249,043, "Method and Apparatus for Secure Entry of Access Codes in a Computer Environment," which is incorporated herein by reference.

At step 230, the issuer 110 binds the cardholder's public key and some or all of the cardholder's payment particulars in a digital certificate, typically by encrypting the cardholder's public key and particular identifying information provided by the cardholder. The encryption key used for encrypting the cardholder's payment particulars—called the domain key—is typically shared between the issuer proxy 110 and the bridge computer 130, and may be either a symmetric key or an asymmetric encryption key. In one embodiment, the domain key may be a public key associated with the bridge computer 130, so that only the bridge computer 130 can decrypt the encrypted cardholder particulars (using a corresponding private key associated with the bridge computer 130). In another embodiment, the domain key may be a symmetric encryption key that is shared by the issuer proxy 110 and the bridge computer 130. In either case, the bridge computer will use the domain key (actually, its private key counterpart, if asymmetric; or the domain key itself, if symmetric) to verify the binding, as will be described later in the section entitled "Authorization." After the issuer proxy 110 combines the cardholder's public key with some or all of the cardholder's payment information and digitally signs the combination to create a digital certificate for the cardholder, the digital certificate for the cardholder is loaded into an electronic payment card for the cardholder. Of course, those skilled in the art will realize that many other types of binding can be used including, without limitation, offloading the signing to a trusted third party, or receiving (rather than creating) the digital certificate from the user (although such binding is less secure).

At step 240, the issuer 110 sends and the cardholder's computer 100 receives the cardholder's electronic payment card, e.g., a piece of software that is downloaded to the cardholder's computer 100. The electronic payment card (typically stored in a software wallet) may be further protected against unauthorized access via a PIN (preferably different from the PIN associated with the cardholder's conventional payment card) or other form of user access code. The access code may be protected against unauthorized detection by the above-mentioned procedures used to protect the private key PIN. (Indeed, if the two PINs are the same, private key access for digitally signing and electronic payment card access for transaction execution could be accessed via a single protocol.) Setting the access code (PIN) for the electronic payment card is preferably done when the electronic payment card is being created by the issuer 110, but can also be done separately, e.g., when the cardholder first accesses his electronic payment card on the cardholder computer 100.

Alternatively, if the cardholder wishes to be able to perform electronic transactions from a variety of locations, the cardholder's private key and/or electronic payment card may be stored at a credential server and downloaded on the fly by a roaming cardholder using a shared secret or challenge-response protocol. In the latter case, commercially available software such as Arcot WebFort from Arcot Systems, Inc., described at http://www.arcot.com/products.html and in co-pending U.S. patent application Ser. No. 09/196, 430, "Method and Apparatus for Secure Distribution of Authentication Credentials to Roaming Users," which is hereby incorporated by reference, may be used to effect the roaming functionality.

One advantage of this enrollment process is that the issuer's participation can be passive, in that the issuer proxy 110 can be operated by any trusted financial institution that participates in the electronic payment system, and is not necessarily the bank or financial institution that issued the conventional payment card to the cardholder. This is important because it suffices that one well-recognized financial institution participates in the system. Furthermore, even the participation of this financial institution can be limited to establishing the issuer proxy 110 on the network for self-service access by the cardholder, and does not require mailings to the cardholder, or other physical interaction with the cardholder.

FIG. 2A illustrates an exemplary electronic payment card created using the preferred embodiment of the invention, in which the card contains: (a) the cardholder's digital certificate, comprising the cardholder's payment particulars, and his public key, portions of which are encrypted under the domain key; and (b) the cardholder's private key.

Figure 3:
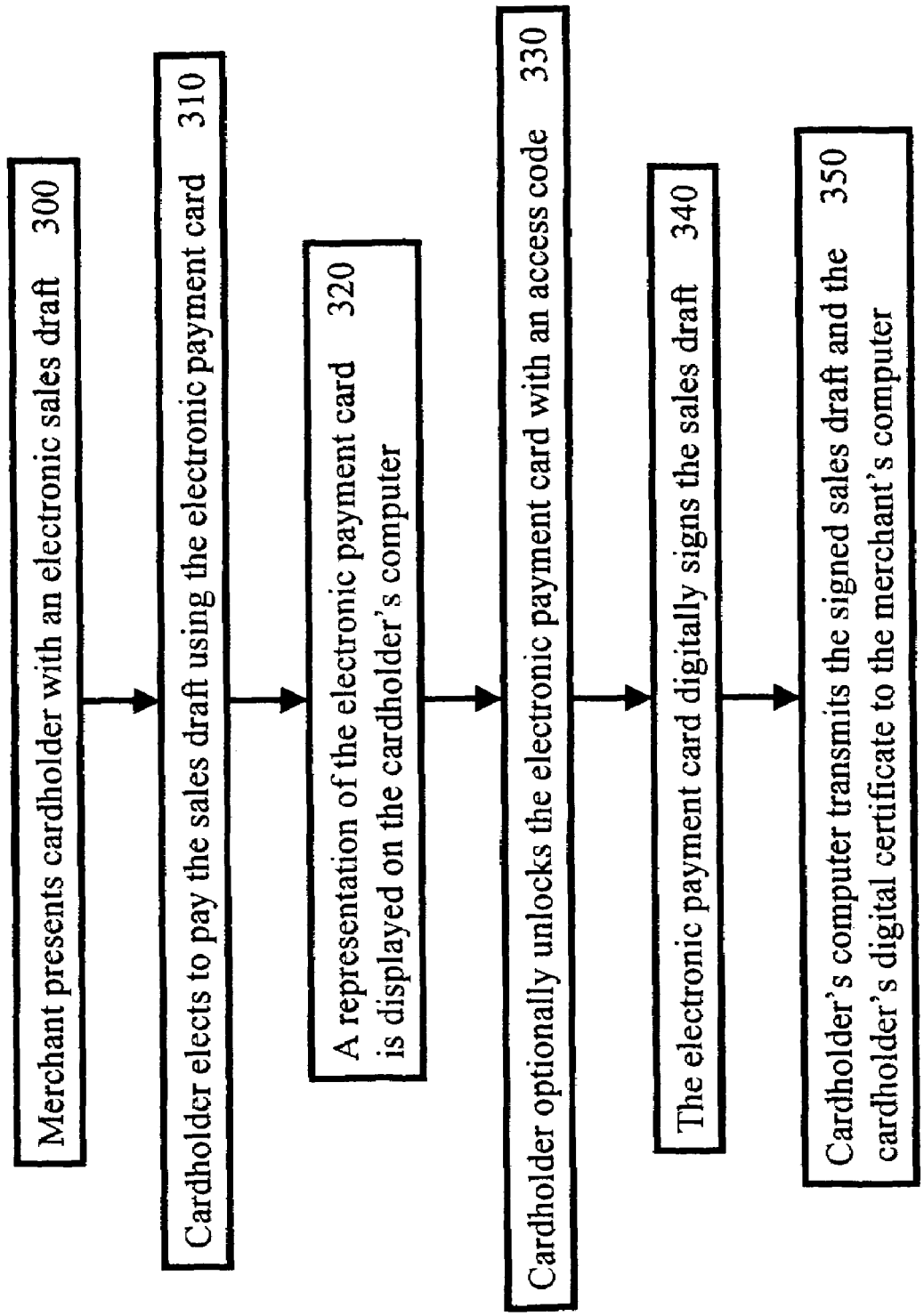
FIG. 3 is a flow chart illustrating an exemplary method for point-of-sale interaction between a cardholder and a merchant.

Point-of-sale Transaction between a Cardholder and a Merchant on the Computer Network A cardholder uses his computer 100 to shop at a merchant's website at merchant's computer 120. Referring now to FIG. 3, at step 300, when the cardholder decides what goods or services he wants to buy, the merchant presents the cardholder with an electronic sales draft.

At step 310, the cardholder elects to pay the sales draft using the cardholder's electronic payment card. At step 320, a representation of the cardholder's electronic payment card may be displayed on the cardholder's computer 100. If the cardholder chose to protect his electronic payment card with an access code, then at step 330 the cardholder unlocks and activates his electronic payment card. If the electronic payment card is protected with an access code, then the electronic payment card cannot be activated unless the correct access code is entered. The access code can be stored in a variety of locations including, without limitation, the cardholder's own memory, or a floppy disk, magnetic stripe card, smart card, or disk drive coupled to the cardholder's computer 100. At step 340, the cardholder's (activated) electronic payment card digitally signs the electronic sales draft that was presented to the cardholder in step 300 using the cardholder's private key. Optionally, the cardholder's electronic payment card can automatically fill in the information used by the sales draft. At step 350, the cardholder's computer 100 sends the digitally signed sales draft and the cardholder's digital certificate to the merchant's computer 120, where it is received by the merchant's computer 120.

Authorization

Figure 4:
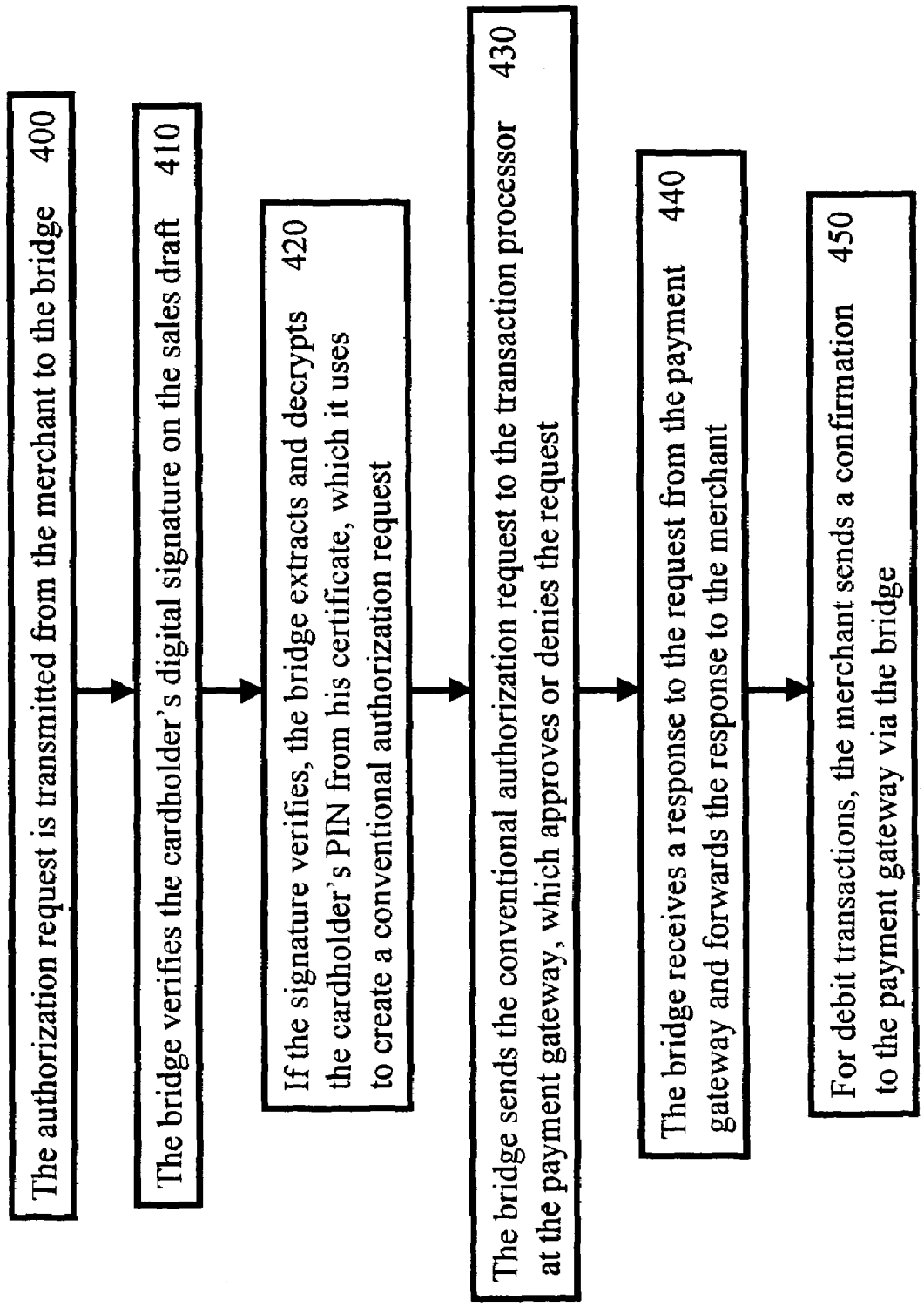
FIG. 4 is a flow chart illustrating an exemplary method for a merchant to obtain authorization for the payment transaction.

Referring now to FIG. 4, at step 400, the merchant's computer 120 sends, and the bridge computer 130 receives, an authorization request from the merchant (seller). The authorization request includes the electronic sales draft with the cardholder's (buyer's) electronic signature and the cardholder's digital certificate. As mentioned above, in one embodiment of the invention, the cardholder's digital certificate includes the cardholder's verification key (public key) and an encrypted version of the cardholder's PIN for his conventional payment card.

At step 410, the bridge computer 130 uses the cardholder's verification key to confirm (verify) that the cardholder's electronic signature on the sales draft was authorized by the cardholder (buyer). If the electronic signature is confirmed, then at step 420 the bridge computer 130 extracts the encrypted version of the cardholder's PIN for his conventional payment card from the cardholder's digital certificate and decrypts the PIN using the private key associated with the domain key (if the PIN was asymmetrically encrypted) or the domain key itself (if the PIN was symmetrically encrypted). In this (or in some equivalent) fashion, the bridge computer 130 can verify the binding (of the payment particulars and the user's public key) that was performed by the issuer 110. The bridge computer 130 uses the decrypted PIN to generate a conventional authorization request as is well-known to those skilled in the art of payment card transaction processing (see, e.g., Visa International Acquirer Services External Interface Specification, Apr. 1 1999, EIS 1080 Version 5.8, available from Visa). The decrypted PIN may be re-encrypted with a key that is shared by the bridge computer 130 and the transaction processor at payment gateway 140. Certain other particulars that are typically used for creating a conventional authorization request, such as the conventional payment card number, conventional credit card holder verification value 2 ("CVV2"), conventional cardholder name and address, or any other cardholder identification information, may also be extracted and-decrypted from the cardholder's digital certificate.

Note that some types of conventional payment transactions do not necessarily use PINs, e.g., some conventional credit card transactions. For these transactions, after the bridge computer 130 verifies the cardholder's digital signature on the sales draft at step 410, the bridge computer 130 generates a conventional authorization request at step 420 without performing the PIN extraction and PIN decryption steps.

At step 430, the bridge computer 130 sends the conventional authorization request to the transaction processor at payment gateway 140. Using the information provided in the authorization request, the payment gateway 140 approves or denies the request and sends its authorization response back to the bridge computer 130.

In an alternative embodiment of the invention, the bridge computer 130 can be integrated into the payment gateway 140. Indeed, any combination of issuer proxy 110, bridge computer 130, and/or payment gateway 140 can be integrated together.

The bridge computer 130 receives from the payment gateway 140 either an approval or a disapproval of the authorization request. In either event, at step 440, the bridge computer 130 forwards the authorization response (approval or disapproval) to the merchant (seller) at the merchant's computer 120.

If the cardholder is making a debit transaction, then at step 450 the merchant's computer 120 sends a confirmation to the payment gateway 140 via the bridge computer 130.

One advantage of this authorization process is that there is minimal impact on the merchant. Another advantage is that the payment gateway 140 can interact with the legacy back-end systems 150 using conventional transaction processing methods. In other words, no changes are necessarily required to the back-end infrastructure.

In an alternate embodiment of the system, the bridge computer 130 can act in "stand-in" mode. Specifically, some financial institutions may choose not to receive the decrypted PIN from the cardholder's digital certificate, relying instead on the bridge computer's assertion that the cardholder's signature verified correctly. If the cardholder PIN was also verified at the issuer proxy 110 during enrollment, the risk of a fraudulent transaction may be deemed low. In such situations, the bridge computer 130 would assemble and transmit an authorization request without a PIN to the transaction processor at payment gateway 140.

In yet another embodiment of the system, the merchant can store a copy of the digital signature of the cardholder along with the sales draft. The bridge computer 130 would process the transaction assuming that the digital signature of the cardholder is valid. In the event that the cardholder disputes the transaction, the merchant must present the stored copy of the sales draft and the cardholder's digital signature. The bridge computer 130 will verify the digital signature and, on the basis of the verification, determine whether the merchant should refund the amount of the transaction. An advantage of this embodiment is that the computational processing required at the bridge computer 130 is reduced. However, the merchant faces an increased risk of fraud.

In yet another embodiment of the system, a user who does not have a conventional credit or debit card (or who wants to get additional conventional payment cards), can be given the option of signing up for a conventional payment card during the electronic payment card enrollment process. The conventional payment card number that is given to this user can then be incorporated into the user's electronic payment card.

In yet another embodiment of the system, a user may choose to enroll his checking account to an electronic payment credential, rather than a debit or credit card. The user would identify himself via a variety of means at enrollment time, or may be given an activation code by his bank that he would use to identify himself for enrollment.

Although the preferred embodiments of this invention create an electronic payment card for conventional debit or credit cards or conventional checking accounts, the present invention enables a bridge to network payment for almost any conventional transaction system. For example, the present invention could also be used for secure electronic bill payment, person-to-person transactions, and electronic auction settlements.

The software described herein, for use by the various computers, is conveniently implemented using C, C++, Java, Javascript, HTML, or XML, running on Windows, Windows NT, Solaris, Unix, Linux, or Macintosh operating systems on virtually any computer platform. Moreover, those skilled in the art will readily appreciate that such software can be implemented using virtually any programming language, running on virtually any operating system on any computer platform.

The various embodiments described above should be considered as merely illustrative of the present invention. They are not intended to be exhaustive or to limit the invention to the forms disclosed. Those skilled in the art will readily appreciate that still other variations and modifications may be practiced without departing from the general spirit of the invention set forth herein. Therefore, it is intended that the present invention be defined by the claims that follow.

What is claimed is:

1. A method of digitally signing a financial transaction, the method comprising:
   presenting an electronic transaction receipt to a user;
   receiving a digitally signed version of the electronic receipt from the user, wherein the electronic receipt is digitally signed by an electronic transaction card associated with the user, wherein the electronic transaction card is suitable for electronic transmission, and comprises payment information suitable for a payment processing system to authorize the financial transaction, and is generated prior to the user performing a financial transaction resulting in the electronic transaction receipt, wherein the digitally signed version of the electronic receipt is transmitted from the user to a merchant, wherein the merchant forwards the digitally signed version of the electronic receipt to a bridge computer; and
   verifying with the bridge computer the digitally signed version of the electronic receipt contains a valid digital signature, wherein if the digital signature is valid, extracting with the bridge computer a sufficient amount of user data from the electronic transaction card to generate a decrypted transaction authorization request and the payment information usable by the payment processing system to authorize the financial transaction.

2. The method of claim 1, wherein the electronic transaction card comprises an electronic credit card or an electronic debit card.

3. The method of claim 1, wherein the user data comprises payment card number, or payment card personal identification number (PIN), or credit card holder verification value.

4. The method of claim 1, wherein the electronic transaction card comprises a digital certificate.

5. The method of claim 1, wherein the electronic transaction card is configured as a user activated client-side program.

6. A computer readable medium, computational apparatus, or server computer comprising computer code for performing the method of claim 1.

7. A method of performing a financial transaction using a digitally signed electronic transaction receipt, the method comprising:
generating an electronic transaction card, wherein the electronic transaction card is generated from at least some user data and a payment account number issued to a user suitable for a payment processing system to authorize a financial transaction;
generating a digital certificate associated with the user;
presenting goods or services to a user for selection;
receiving a transaction request for at least some of the goods or the services presented to the user;
presenting an electronic receipt to a user for verification of the selected goods or services;
receiving with a merchant the digital certificate and a digitally signed version of the electronic receipt digitally signed by the electronic transaction card, wherein the merchant forwards the digital certificate and digitally signed version of the electronic receipt to a bridge computer for authentication;
authenticating the digital signature of the electronic transaction card with the bridge computer; and
when the digital signature is authenticated, transmitting a decrypted authorization request including the payment information from the bridge computer to the payment processing system to authorize the financial transaction.

8. The method of claim 7, wherein generating a digital certificate comprises binding the user data and public key into the digital certificate.

9. The method of claim 7, further comprising presenting the electronic transaction card to the user for acceptance thereof.

10. The method of claim 7, wherein receiving the digitally signed version of the electronic receipt comprises signing the electronic sales receipt with a private key associated with the user.

11. The method of claim 7, wherein receiving the digitally signed version of the electronic receipt comprises using the electronic transaction card to fill-in at least some of the user data on the electronic transaction receipt.

12. The method of claim 7, wherein authenticating the digital signature comprises employing a verification key to authenticate the digital signature.

13. The method of claim 7, further comprising if the digital signature is authentic, extracting an access personal identification number (PiN) for the payment account number from the digital certificate.

14. The method of claim 13, wherein extracting the access PIN comprises employing the access PIN in generating a transaction authorization request usable by a payment processing system.

15. A computer readable medium, computational apparatus, or server computer comprising computer code for performing the method of claim 7.

16. A system for digitally signing electronic transaction receipts, the system comprising:
a processor when operated by code from a computer-readable medium is configured to perform operations of:
processing a digital certificate and electronic transaction card associated with a user, wherein the electronic transaction card is generated from at least some user data and a payment account number issued to a user suitable for a payment processing system to authorize a financial transaction;
processing a transaction request for at least some financial transaction presented to the user after generating the electronic transaction card;
presenting an electronic receipt to a user for verification of the financial transaction;
transmitting a digitally signed version of the electronic receipt digitally signed by the electronic transaction card to a merchant, wherein the transaction processor passes the digitally signed version of the electronic receipt to a bridge computer; and
authenticating with the bridge computer the digital signature of the electronic transaction card using the digital certificate; and
when the digital signature is authenticated, transmitting a decrypted authorization request including the payment information from the bridge computer to the payment processing system for authorization.

17. The system of claim 16, wherein the electronic transaction card comprises at least some user data and a payment card account number issued to the user.

18. The system of claim 16, wherein processing the digitally signed version of the electronic receipt comprises the electronic transaction card digitally signs the electronic receipt using a user's private key.

19. The system of claim 16, wherein authenticating the digital signature comprises transmitting the electronic receipt, digital certificate, and digital signature to the bridge computer.

* * * * *